United States Patent
Gali

(10) Patent No.: US 7,431,229 B2
(45) Date of Patent: Oct. 7, 2008

(54) GARBAGE MATERIAL REDUCTION AND SEPARATIONS PROCESS AND ORGANIC FUSION PROCESS

(76) Inventor: Carl Gali, 16725 N. Red Sunset Trail, Tucscon, AZ (US) 85739

( * ) Notice: Subject to any disclaimer, the term of this patent is extended or adjusted under 35 U.S.C. 154(b) by 0 days.

(21) Appl. No.: 11/635,442

(22) Filed: Dec. 8, 2006

(65) Prior Publication Data

US 2007/0170290 A1    Jul. 26, 2007

Related U.S. Application Data

(62) Division of application No. 11/335,886, filed on Jan. 20, 2006, now Pat. No. 7,175,115.

(51) Int. Cl.
*B02C 17/00* (2006.01)
*B02C 23/08* (2006.01)
*B02C 9/04* (2006.01)

(52) U.S. Cl. ............... 241/24.14; 241/77; 241/79.1; 241/101.1; 241/152.1; 241/DIG. 38

(58) Field of Classification Search ............ 241/24.14, 241/38, 65, 77, 79.1, 101.1, 152.1, DIG. 38
See application file for complete search history.

(56) References Cited

U.S. PATENT DOCUMENTS 5,522,554 A * 6/1996 Blank et al. .......... 241/23
5,630,553 A * 5/1997 Serban et al. .......... 241/23

* cited by examiner

*Primary Examiner*—Faye Francis
(74) *Attorney, Agent, or Firm*—John E. Vandigriff

(57) ABSTRACT

A new method and concept for the recovery of valuable materials from solid waste and the conversion of organic solid waste and sewage into crude oil, gas, usable elemental solids and water uses a two step process, solid waste reduction and an organic fusion process. Two resources are used in the Waste Resource Process, solid waste (municipal garbage) and waste water (municipal sewage). Waste water goes directly into the Organic Fusion Process. Solid waste requires processing for removal of non-organic products and preparation of the organics that are used in the Organic Fusion Process. Solid waste organics used in the Organic Fusion Process include, plastics, papers, food and yard waste, organic construction debris, waste oils, many household and commercial chemicals; anything with a hydrocarbon molecular structure.

6 Claims, 2 Drawing Sheets

GARBAGE MATERIAL REDUCTION AND SEPARATIONS PROCESS AND ORGANIC FUSION PROCESS

PRIOR APPLICATION

This application is a divisional application of U.S. application Ser. No. 11/335,886, filed Jan. 20, 2006. Now U.S. Pat. No. 7,175,115.

FIELD OF THE INVENTION

The invention relates to a method and system for the recovery of materials and more particularly to the recovery of valuable materials from solid waste and the conversion of organic solid waste and sewage into crude oil, gas, usable elemental solids and water.

BACKGROUND OF THE INVENTION

The following patents are described to show some of the prior art.

U.S. Pat. No. 5,269,947, relates to a processor comprising means for mixing a process material with a process liquid (such as water) and forming an emulsion or slurry. Means is provided for pressuring and heating the slurry, and the slurry is then fed to means for quickly reducing the pressure to a relatively low value and further increasing the temperature. The rapid drop in pressure and increase in temperature causes volatile components of the slurry to convert to a gas and separate from the remainder of the slurry which is removed from the processor in the form of solids. The gas is fed to one or more condensers which separate the gas into useful liquids such as various grades of oil.

U.S. Pat. No. 5,431,702 is for a process for time production of fuel pellets or briquettes from sewage sludge solids and municipal solid waste with minimal drying requirements. In one of its more specific aspects, this invention relates to a solid pelleted or briquetted fuel product consisting essentially of sewage sludge solids, waste paper and/or refuse derived fuel, and crushed coal, and to its method of preparation. In still another of its specific aspects, this invention relates to a method for the production of fuel gases from sewage sludge solids and cellulosic wastes.

U.S. Pat. No. 5,104,419, discloses a process for converting solid waste into a synthesis suitable for producing liquid fuel, comprising (a) partially oxidizing and combusting solid waste material in a closed combustion zone at a temperature of 800 degrees to 1000 degrees C., and at a pressure below ambient to produce combustion gases by introducing into the combustion zone a gaseous oxidant comprising oxygen having a purity of at least 95% by volume and carbon dioxide in an oxygen to carbon dioxide ratio, by volume, of about 50:50, (b) conducting the combustion gases, oxygen and carbon dioxide through the solid waste material; (c) withdrawing a producer gas comprising the combustion gases and any unreacted oxygen and carbon dioxide; (d) removing particulate matter from the producer gas; (e) separating carbon dioxide from the producer gas and recycling a portion of the separated carbon dioxide to the combustion zone; (f) separating the less volatile, condensable components of the carbon dioxide-free producer gas, from the more volatile, non-condensable synthesis gas components thereof, and (g) compressing the produced gas at some time prior to the completion step (e). In a preferred embodiment, the more volatile components and at least a portion of the separated carbon dioxide from step (e) are admixed and the resulting a mixed gas mixture is reacted to form methanol. Preferably, the less volatile components are converted by chemical reaction to hydrogen and the hydrogen is recycled into a mixture with the produced gas at some time prior to the commencement of step (e).

U.S. Pat. No. 4,787,321 is directed to a solid waste conversion plan for the conversion of such solid waste as old tires to a gas or liquid hydrocarbon product, wherein the partial pyrolysis of the solid waste is carried out in a reactor having a grate in the lower section and a plurality of rotating fingers extending through the grate for preventing compaction of the solid waste in the reactor. The reactor, a heat exchange means and a stripper are connected in series. A blower is positioned between the heat exchange means and stripper for drawing oxygen-containing gas into the reactor and removing the gases formed therein and passing those gases through the heat exchange means and into the stripper.

U.S. Pat. No. 4,152,122, is defined as an improved system for producing methane-containing product gas by the hydrogasification process. With the system, solid municipal waste is comminuted and dried following which it is introduced to the lock hopper receivers for transference to an elongate hydrogasification reactor. Synthesis gas is introduced to a lower region of the reactor and the comminuted waste, including inorganic materials, is dried and converted to methane-containing product gas and char. The char is removed from the system by a variety of separation systems including cyclone separators or aspirators and the inorganic fractured waste materials pass through the reactor but are undamaged and in a sterile condition ideally suited for recovery. A gasification reactor is incorporated with the system which receives char from the process as well as oxygen to produce the synthesis gas utilized in the hydrogasification reactor. Where no inorganic materials are present, the organic materials may be introduced both to the gasification reactor to produce synthesis gas as well as to the hydrogasification reactor to produce char end product gas. The char is removed from the product gas and returned to the synthesis gas producing gasification reactor. Drying may be carried out utilizing a fluidized sand bed drying technique.

SUMMARY OF THE INVENTION

Two resources are be used in the Waste Resource Process, solid waste (municipal garbage) and waste water (municipal sewage). Waste water goes directly into the Organic Fusion Process. Solid waste requires processing for removal of non-organic products and preparation of the organics that will be used in the Organic Fusion Process. Solid waste organics used in the Organic Fusion Process include, plastics, papers, food and yard waste, organic construction debris, waste oils, many household and commercial chemicals; anything with a hydrocarbon molecular structure.

Solid waste is processed through grinders, electro-magnetic sorting, eddy current sorting and trommels to remove inorganic materials. The organics are then sent through a series of grinders before being mixed with waste water to produce the sludge for Organic Fusion Processing. Large items are removed from the solid waste before it is reduced in a tub hammer mill grinder. The tub grinder reduces the solid waste particle size for further processing. Once ground up, the ferrous metals are removed using an electromagnetic process and the non-ferrous metals are removed using an eddy current magnet process. The solid waste is then sent through a series of trommels that use weight to remove glass and other inorganics such as concrete, rock and dirt. The remaining organics are then sent though two grinders, a gross and then fine grinding. The gross process uses a hammer mill grinder to reduce particulate size to at least half an inch. The fine process employs hammer mill and screening process reducing the particulate size to less than 1/16th inch. The ground organics are then mixed with waste water at a one to one ratio to produce sludge, ready for the Organic Fusion Process.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Solid waste is processed through grinders, electro-magnetic sorting, eddy current sorting and trommels to remove inorganic materials. The organics are then sent through a series of grinders before being mixed with waste water to produce the sludge for Organic Fusion Processing (FIG. 1).

Large items will first be removed from the solid waste before it is reduced in a tub hammer mill grinder. The tub grinder reduces the solid waste particle size for further processing. Once ground the ferrous metals are removed using an electro-magnetic process and the non-ferrous metals are removed using an eddy current magnet process. The solid waste is then sent through a series of trommels that use weight to remove glass and other inorganics such as concrete, rock and dirt.

The remaining organics are then sent though two grinders, a gross and then fine grinding. The gross process uses a hammer mill grinder to reduce particulate size to at least ½ inch. The fine process employs hammer mill and screening process reducing the particulate size to less than 1/16 inch. The ground organics are then mixed with waste water at a one to one ratio to produce sludge, ready for the Organic Fusion Process.

Figure 1:
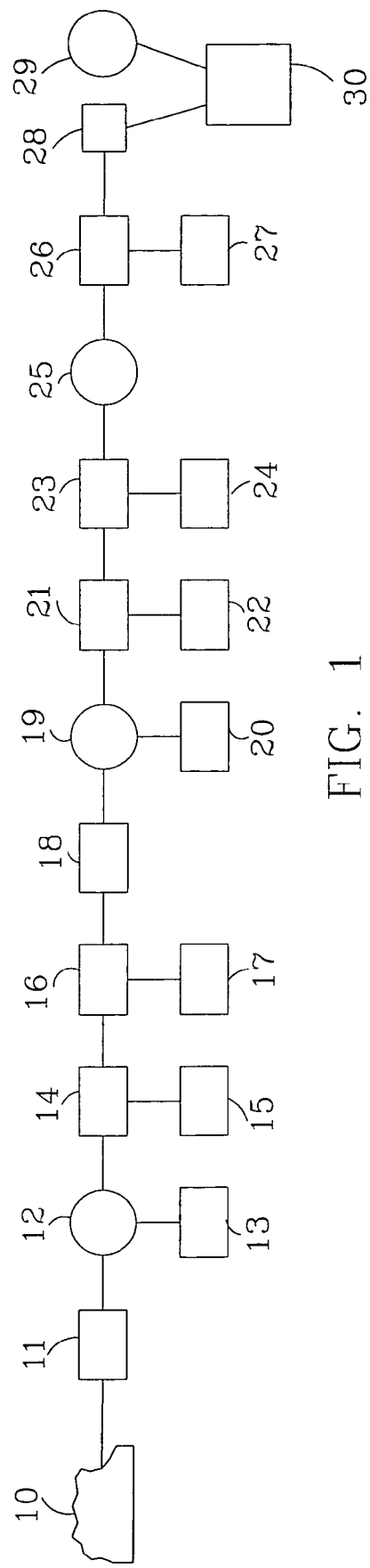
FIG. 1 is show a flow diagram of the material reduction and separation process.

The Solid waste process is illustrated in the flow diagram in FIG. 1. The solid waste is processed through grinders, electromagnetic sorting, eddy current sorting and trommels to remove inorganic materials. The organics are then sent through a series of grinders before being mixed with waste water to produce the sludge for Organic Fusion Processing. Large items are removed from the solid waste before it is reduced in a tub hammer mill grinder. The tub grinder reduces the solid waste particle size for further processing. Once ground up, the ferrous metals are removed using an electro-magnetic process and the non-ferrous metals are removed using an eddy current magnet process. The solid waste is then sent through a series of trommels that use weight to remove glass and other inorganics such as concrete, rock and dirt. The remaining organics are then sent though two grinders, a gross and then fine grinding. The gross process uses a hammer mill grinder to reduce particulate size to at least a ½ of an inch. The fine process employs hammer mill and screening process reducing the particulate size to less than 1/16th inch. The ground organics are then mixed with waste water at a one to one ratio to produce sludge, ready for the Organic Fusion Process.

As illustrated in FIG. 1, the solid waste 10 is places in a mobile loader that transfers garbage to the process unit. A Tub Hammermill Grinder 12 reduces all incoming garbage to minus 3-inch size. It also has built-in magnets that remove all ferrous metals from the flow. The ferrous metals are placed in a collection Bin 13. A Separator 14 removes (Eddy current magnets) removes non-ferrous metals from the flow and are placed in collection bin 15.

After removal of the ferrous and non-ferrous materials, large and heavy inorganic materials are placed in separator 16, which may be, for example, a trommel and centrifugal processes. The inorganics are then placed in collection ben 17. The inorganics may include, for example, glass, rock, gravel, etc.

Storage bin 18 is used to store the excess 3 inch material. The material is then placed in Tub Hammermill Grinder 19, which has a ferrous magnetic separator built in it, is used to reduce the excess 3 inch material to a minus ½ inch size. A collection bin 20 collects the ferrous material. Separator 21, using eddy current magnets, separates the non-ferrous metals and put them in collection bin 22.

Separator 23 separates inorganic fine material using trommel and air floatation for the light organics to keep them in the flow and allowing heavier fine inorganics to drop out into collection bin 24.

The ½ inch size material is then reduce to 1/16th inch size in Hammermill grinder 25. The 1/16th inch size material is then separated in separator 26 which is a final separation of inorganics using air flotation. The inorganics are then placed in collection bin 27.

The ground organic material is placed in storage bin 28. A water tank 29, where possible, will contain sewage waste water which is mixed with the ground organic material in mixing vessel 20 to provide a sludge mix for further processing.

A summary of the organic fusion process (FIG. 2) is as follows. In the first step of the Organic Fusion Process (FIG. 1) the organic solids and water are mixed creating a sludge, and then injected into a medium heated closed chamber. The heat in the chamber creates high pressures in the sludge due to the expansion of the water in the mixture.

The increased temperature and pressure fuses the water (a simple molecular compound) into the organics (a complex molecular compound). The water therefore penetrates the complex organic structures at the molecular level. Fusion of the organic and water molecules takes approximately 20 minutes.

The fused organic and water mixture is then released into a low pressure, lower temperature diffusion reactor. The water instantly changes state into a high pressure steam. The energy of the steam release breaks the complex organic molecular structures, leaving simpler hydrocarbon and fractured elemental components.

Expansion of the materials in the diffusion chamber releases gases (oxygen, nitrogen, carbon dioxide and combustible gases), steam, carbons, hydrocarbons, elemental structures and various types of solid sedimentation. The steam, inorganic and organic gases are vented off. The heat from these gases is regenerated into the incoming sludge and then separated out into their original components. A separation process is used to recover combustible gases that can then be burned to produce heat and electricity. The steam is condensed and filtered and the water stored in tanks for later use.

The remaining solid consisting of hydrocarbons, elemental solids, water vapor and remaining trapped gases, such as oxygen, nitrogen, carbon dioxide, and other free gases are mechanically moved through a dryer. The dryer temperature is kept below the kindling point, for example 400° F., of the hydrocarbons to prevent any oxidation. The drying process removes all the moisture and remaining gases from the flow, namely oxygen thus preventing oxidation of the hydrocarbons at the higher temperatures required during the fracturing process. The steam and gas is vented off back in to the vent conduit of the diffusion reactor for removal. The remaining dried solids consist of hydrocarbon and elemental structures.

The hydrocarbon rich elemental solids are then mechanically moved into the Fracturing reactor. In the fracturing process the solids are heated to a sufficient temperature where all hydrocarbon compounds are in a vapor state. The oil vapors and remaining organic gases are vented out of the reactor into an exchanger for heat regeneration to preheat the incoming sludge. The gases are then cooled, forming crude oil and natural gas. The crude oil is sent to a storage tank. The natural gas is stored and used for process energy. The solids remaining in the Fracturing reactor are mechanically transferred out and are cooled, (this heat is also regenerated into the incoming sludge) then sent to a storage bin.

This is a closed system process, there are no hazardous gases or chemicals that are vented off or escape from this process when in operation. Forty five percent of the original energy used to heat the process is regenerated into the incoming sludge before it enters the fusion reactor.

Figure 2:
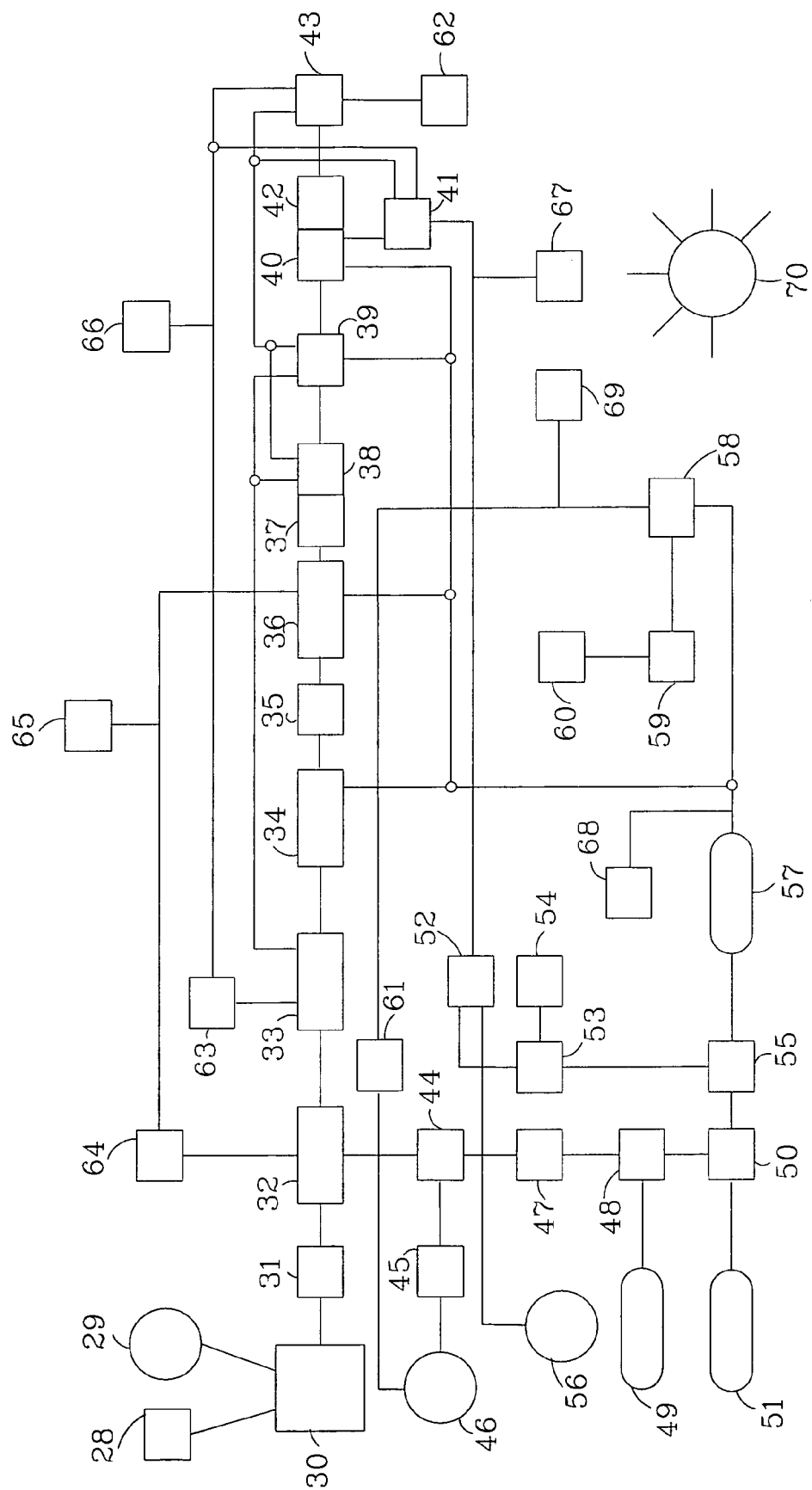
FIG. 2 shows a flow diagram of an organic fusion process.

A detailed description of the organic fusion process is shown in FIG. 2. FIG. 2 shows the Storage bin 19, water tank 20 and mixing vessel 21 of FIG. 1. The material from mixing vessel 21 is move to an injector pump 31 which pumps the sludge in to heat regeneration exchanger 32. A high pressure sludge is created due to the expansion of water in the mixture. There are two regeneration exchangers. Exchanger 31 is steam/gas to sludge, and heat generation exchanger 33 is thermal fluid to sludge. Fluid Transfer pump 63 is connected to conduits of a closed loop circulating system which transfers a thermal fluid that is heated by heat exchanger 39, this heats exchangers 41, 43, dryer 38 and regenerator exchanger 33 during process start up. When the process is in operation, this thermal fluid becomes the heat transfer agent to regenerate the heat from exchangers 41 and 43 to exchanger 39, regenerator 33 and dryer 38.

The water and organic material is then sent to fusion reactor 34. The fused organics and water is transferred by transfer mechanism 35 to diffusion reactor 36. Here the sludge is expanded and separated into steam, gases, hydrocarbons and solids. Steam and gases are move through conduit 65 to separator 64 to removal solids from steam and gas flow, and the steam and gases are reintroduced into heat regeneration exchanger 32. Transfer Mechanism 37 transfers the Hydrocarbons and elemental solids which are then dried in dryer 38. Heat exchanger 39 accepts the oil vapor and gases, and provides heat for regenerator during startup.

Fracturing Reactor 40 is for separating of oil vapor and gases from elemental solids which are transferred to Heat Exchanger 41. The Elemental solids are transferred though transfer mechanism 42 to heat exchanger 43, and then to collection bin 62.

As previously stated, the steam/gas to sludge is basically preformed in heat regenerator 32. It is then transferred to separator 44 which separates the water from the gases. The water is purified in purifier 45 and placed in water storage tank 46.

The gases are dried and filtered in 47, and separated in separator 48, where the nitrogen is placed in storage tank 49. Oxygen is separated in separator 50 and placed in storage tank 51. The elemental solids which are transferred to Heat Exchanger 41 are then transferred to separator 52 in which crude oil is separated from gases and stored in storage tank 56. Gases are separated and filtered in separator filter 53. Unwanted gases are placed in storage tank 54. Pump 55 pumps the combustible gases to storage tank 57. Combustible gases from storage tank are used to supply energy to reactors 34, 36, 40 and exchanger 39, and gas turbine 58 which is a mechanical power source for turning A.C. Generator 59. Water for turbine 58 is pumped from water storage tank 37 by water pump 61 to turbine 58. Generator 59 provides Electrical power for the over all process. Transfer switch 60 is used in the Electrical distribution.

Combustible gas line 68 supplies combustible gas to turbine 58 and to fusion reactor 34, diffusion reactor 36, heat exchanger 39 and fracturing reactor 40. Conduit 67 supplies gasses and oils. Water conduit 69 is a water conduit for injection in gas turbine 58. The overall control for the system is a central computer monitor 70.

The invention claimed is:

1. A system for of processing waste material, including solid and liquid materials, into useable products, comprising the steps of:
    at least one grinder for reducing the size of the waste material;
    a sorter for sorting the reduced size material by separating it with at least one of a electro-magnetic process and an eddy current magnetic process;
    at least one trommel to reduce the size of the material and to removed inorganic materials;
    a separator for separating and storing the processed separated inorganic materials;
    a grinder to process the organic materials to reduce it to a small size;
    a storage tank for mixing the organic material with sewerage waste water;
    a lower temperature diffusion reactor for the expansion and separation of the organic material/water material into steam, gases, hydrocarbons, and solids;
    a dryer for drying and to allow the separating and storing of the gases;
    storing facility for the storage of the solid materials; and
    a turbine utilizing the stored gases to power and to provide mechanical and electrical power sources used in the processing of the waste material.

2. The system according to claim 1, including the step of processing the reduced size material through at least one trommel to removed inorganic materials, includes using the trommel and air flotation for the light organics to keep them in the flow and allowing heavier, fine inorganics to drop out.

3. The system according to claim 1, including a heat exchanger for elemental solids produced in the waste material process for providing heat used in the processing of the waste materials.

4. The system according to claim 1, including a dryer for separating and storing the gases into at least oxygen, combustible, and unwanted gases.

5. The system according to claim 1, including a heat exchanger for oil vapors and gases produced in the waste material process for providing heat used in the processing of the waste materials.

6. The system according to claim 1, including central computer monitor and control for controlling the method of processing.

* * * * *